AUTOMATIC ADJUSTMENT OF TRANSVERSAL FILTER SO THAT RECEIVED PULSE IS CORRECTED TO CONFORM WITH STANDARDIZED SHAPE

Filed March 12, 1963 3 Sheets-Sheet 1

INVENTORS J. R. DAVEY
B. R. SALTZBERG

BY [signature]

ATTORNEY

AUTOMATIC ADJUSTMENT OF TRANSVERSAL FILTER SO THAT RECEIVED PULSE IS CORRECTED TO CONFORM WITH STANDARDIZED SHAPE

Filed March 12, 1963

3 Sheets-Sheet 3

United States Patent Office
3,289,108
Patented Nov. 29, 1966

3,289,108

AUTOMATIC ADJUSTMENT OF TRANSVERSAL FILTER SO THAT RECEIVED PULSE IS CORRECTED TO CONFORM WITH STANDARDIZED SHAPE

James R. Davey, Franklin Township, Somerset County, and Burton R. Saltzberg, Middletown, N.J., assignors to Bell Telephone Laboratories, Incorporated, New York, N.Y., a corporation of New York Filed Mar. 12, 1963, Ser. No. 264,593
6 Claims. (Cl. 333—18)

This invention relates to transversal filters and more particularly to equipment for automatically adjusting a transversal filter to obtain a preselected transmission characteristic.

A typical transversal filter is composed of a continuous delay line having taps along its length that are joined at a common point constituting the filter output. A multiplier that multiplies one of the tapped signals by a factor ranging between plus and minus one is situated in each of the signal paths between the taps and the filter output. The multiplication factors introduced by the multipliers determine the transmission characteristics of the transversal filter. Each multiplier setting represents an independent variable effecting the transmission characteristics of the transversal filter. Thus, transversal filters possess the capability of being adjusted over a wide range of transmission characteristics by changing the multiplier settings.

The advantageous versatility of the transversal filter is offset in some measure by the difficulty encountered in arriving at the multiplier settings necessary to acquire a preselected transmission characteristic. Conventionally, the transversal filter is set by a human operator whose job it is to adjust each multiplier setting until the response of the transversal filter to a known test signal, as indicated by visual observation of an oscilloscope trace, appears to be acceptably near the preselected transmission characteristic. Such manual adjustment calls for the exercise of judgment that requires a skilled and experienced operator. Several systems are available that automatically adjust the multipliers of a transversal filter to introduce a preselected phase characteristic. The systems, however, leave the amplitude characteristic unaccounted for, thus requiring independent consideration thereof. Complex computers that determine the multiplier settings, taking into account both the amplitude and phase characteristics, of the transversal filter have also been devised.

An attractive application of the transversal filter lies in the equalization of conventional telephone transmission lines, during periods in which they are to be employed to transmit high speed analog and digital data, because the transversal filter is capable of compensating for any of the wide range of transmission characteristics that would be expected to be encountered in a large group of telephone lines. By equalizing the telephone lines it is possible to transmit data at a higher rate, thus reducing the time in which the telephone lines are occupied by data signals. To put this plan into operation efficiently a small pool of equalizers could be shared on a one-at-a-time basis among a large group of telephone lines. Such use of the equalizers, however, would entail adjustment of each equalizer every time it is connected to a different telephone line. The tedium of adjusting the equalizer each time it is used diminishes to a large extent the resultant advantage of equalizing the telephone plant for high speed data transmission.

It is, therefore, the object of this invention to set the multipliers of a transversal filter simply and automatically to produce preselected phase and amplitude characteristics.

In accordance with the above object, periodic pulses of known wave form from a test signal source are applied to the input of a transversal filter having independently adjustable multipliers. During each cycle of the test pulse signal, samples of the pulse wave form appearing at the filter output are taken at different points of time, equal in number to the number of multipliers in the transversal filter. The preselected transmission characteristic for the filter may be specified in terms of the pulse wave form desired at the filter output in response to the application of a known test pulse wave form to the filter input. Signals from a reference source are chosen to correspond in value to the values of the pulse wave form desired at the output of the filter at the sampling times of the pulse wave form appearing at the filter output. Each sample of the pulse wave form appearing at the filter output is compared with its respective counterpart from the reference source and control signals are derived each representative of the difference, if any, between a sample and the value of its reference signal. The control signals each adjust a different multiplier through a feedback control loop until the samples taken at the filter output all coincide with the values of the reference signals. When this condition is attained, the transversal filter is properly adjusted to exhibit the preselected transmission characteristic and the feedback control loops may be disconnected.

These and other features of the invention will become more apparent from consideration of the following detailed description of a specific embodiment in which.

Figures 1, 2:
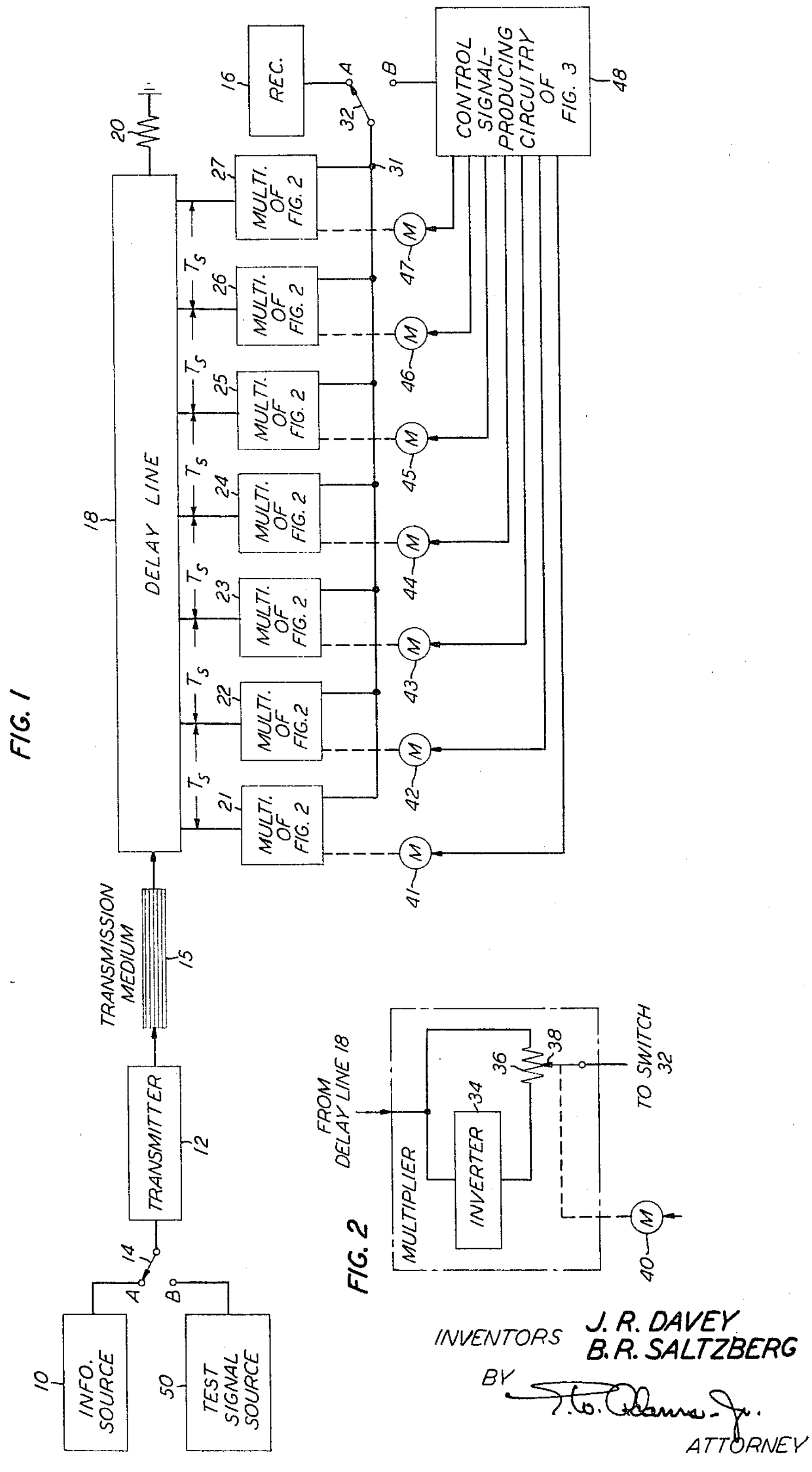
FIG. 1 is a schematic diagram in block form showing a transversal filter employed as an equalizer in a communication system and circuitry arranged in accordance with the invention for adjusting the transversal filter.
FIG. 2 is a schematic diagram in detail of one of the multipliers shown in block form in FIG. 1.

In FIG. 1 a source of information 10 is shown connected to a transmitter 12 through a switch 14 when in state A, which is its position during normal operation of the communication system depicted. Transmitter 12 prepares the information for application to a transmission medium 15 that could be a telephone line, a wireless link, or the like. Transmission medium 15 introduces amplitude and phase distortion to be compensated for prior to application of the information recovered from medium 15 to a receiver 16. For the purpose of equalization, a transversal filter is provided comprising a uniform delay line 18 terminated in its characteristic impedance 20 and having taps along its length, at intervals of transmission delay (designated $T_S$) less than the reciprocal of twice the highest frequency to be transmitted through the system, joined at a common summing node 31, that constitutes the filter output. Common node 31 may take the form of a summing amplifier or other device that permits signal addition. Signal multipliers 21, 22, 23, 24, 25, 26, and 27, respectively, are interposed between individual taps from delay line 18 and common node 31. Common node 31 is coupled to receiver 16 through a switch 32 when in state A. As is well known in the transmission network art, the multiplication factors introduced by multipliers 21 through 27, ranging between plus one and minus one, determine the transmission characteristics of the transversal filter.

FIG. 2 discloses circuitry that could be employed as a multiplier in FIG. 1. One end terminal of a potentiometer 36 is connected directly to the delay line tap. The other end terminal of potentiometer 36 is connected to the same delay line tap by a signal inverter 34. The position of a slider arm 38 on potentiometer 36 determines the polarity and magnitude of the multiplication factor. For example, when slider arm 38 is at the end terminal of potentiometer 36 connected directly to the delay line tap, unattenuated and uninverted signal transmission through the multiplier occurs. Thus, this condition represents a multiplication factor of plus one. When slider arm 38 is at the end terminal of potentiometer 36 connected to inverter 34, unattenuated but inverted signal transmission occurs through the multiplier. This condition represents a multiplication factor of minus one. A zero multiplication factor results when slider arm 38 is centered between the end terminals of potentiometer 36. Intermediate values of multiplication factor result by varying slider arm 38 between the end terminals of potentiometer 36. A dashed line from a direct-current motor 40 represents a mechanical linkage for so moving slider arm 38 in response to electrical signals controlling motor 40.

When it is desired to readjust multipliers 21 through 27 to change the transmission characteristics of the transversal filter because the transmission characteristics of medium 15 change, a new medium is substituted for 15, or some other reason, switches 14 and 32 are placed in state B. This connects a test signal source 50, producing periodical pulses of known wave form, to transmitter 12 and substitutes filter adjustment equipment for receiver 16. The pulses from source 50 should be spaced apart sufficiently to avoid appreciable interference between successive pulses after distortion is encountered. Thus, usually the rate of the pulses from source 50 will be a small fraction of the highest frequency to be transmitted through the system under normal operating conditions.

Figure 4A:
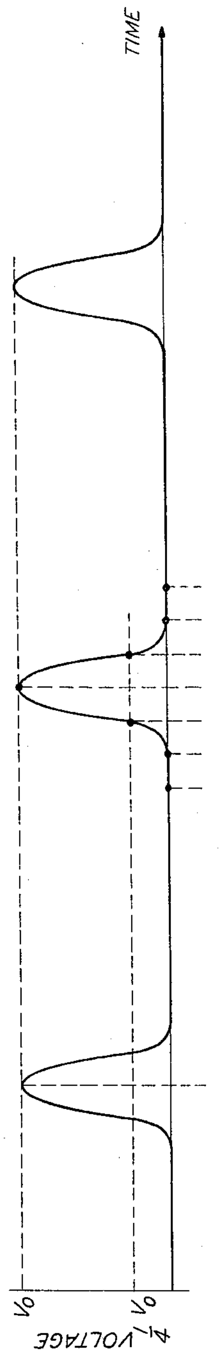
FIGS. 4A and 4B are graphs representing wave forms useful in comprehending the mode of operation of the invention.
Figure 4B:
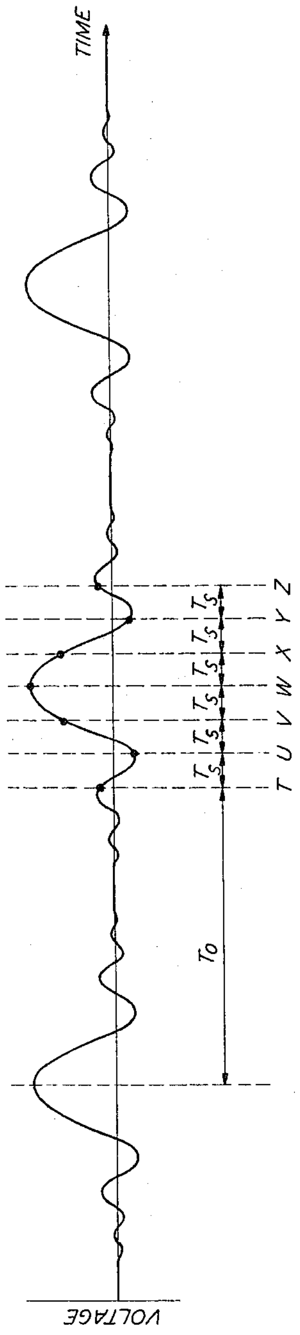

Assume that before adjustment of the transversal filter the pulse wave form appearing at the output of the transversal filter is as depicted in FIG. 4B and the pulse wave form required at the output of the transversal filter to produce the desired over-all system transmission characteristics, taking into consideration the pulse wave form produced at source 50, is as depicted in FIG. 4A. In the special case in which the transversal filter is to equalize the system to provide maximally flat amplitude versus frequency and maximally linear phase versus frequency characteristics, the wave form desired or specified at the filter output (FIG. 4A) is the wave form of the signal emanating from test signal source 50. In other cases, the wave form specified at the output of the transversal filter is different from the test signal wave form at source 50 and determinable as a function of the preselected transmission characteristics of the equalized system and the wave form of the signal emanating from test signal source 50.

As part of the multiplier adjustment operation, the output of the transversal filter is applied to control signal-producing circuitry 48, explained in detail below in connection with FIG. 3. Briefly, in control signal-producing circuitry 48 during each cycle of the test signal time-spaced samples, equal in number to the number of multipliers, are taken of the pulse wave form (FIG. 4B). These samples are each compared with a corresponding signal from a reference source, the values of which are dictated by the relative value of the specified wave form (FIG. 4A) at points corresponding to the sample points of the pulse wave form appearing at the filter output, and control signals are developed, each proportional to the discrepancy between one sample and its corresponding reference signal. As shown in FIG. 1, these control signals emanate from control signal-producing circuitry 48 and are applied each to a different one of direct-current motors 41, 42, 43, 44, 45, 46, and 47. Motors 41 through 47, coupled mechanically to multipliers 21 through 27, respectively, continue to operate and adjust their respective multipliers responsive to the control signals developed by control signal-producing circuitry 48 until each sample of the pulse wave form appearing at the filter output coincides in value with its associated reference signal. When this condition is reached, motors 41 through 47 cease operation and multipliers 21 through 27 are set so that the transversal filter, together with medium 14, exhibits the preselected transmission characteristic. Switches 14 and 32 are then returned to state A and the system, now equalized, is ready to transmit information from source 10 to receiver 16.

Figure 3:
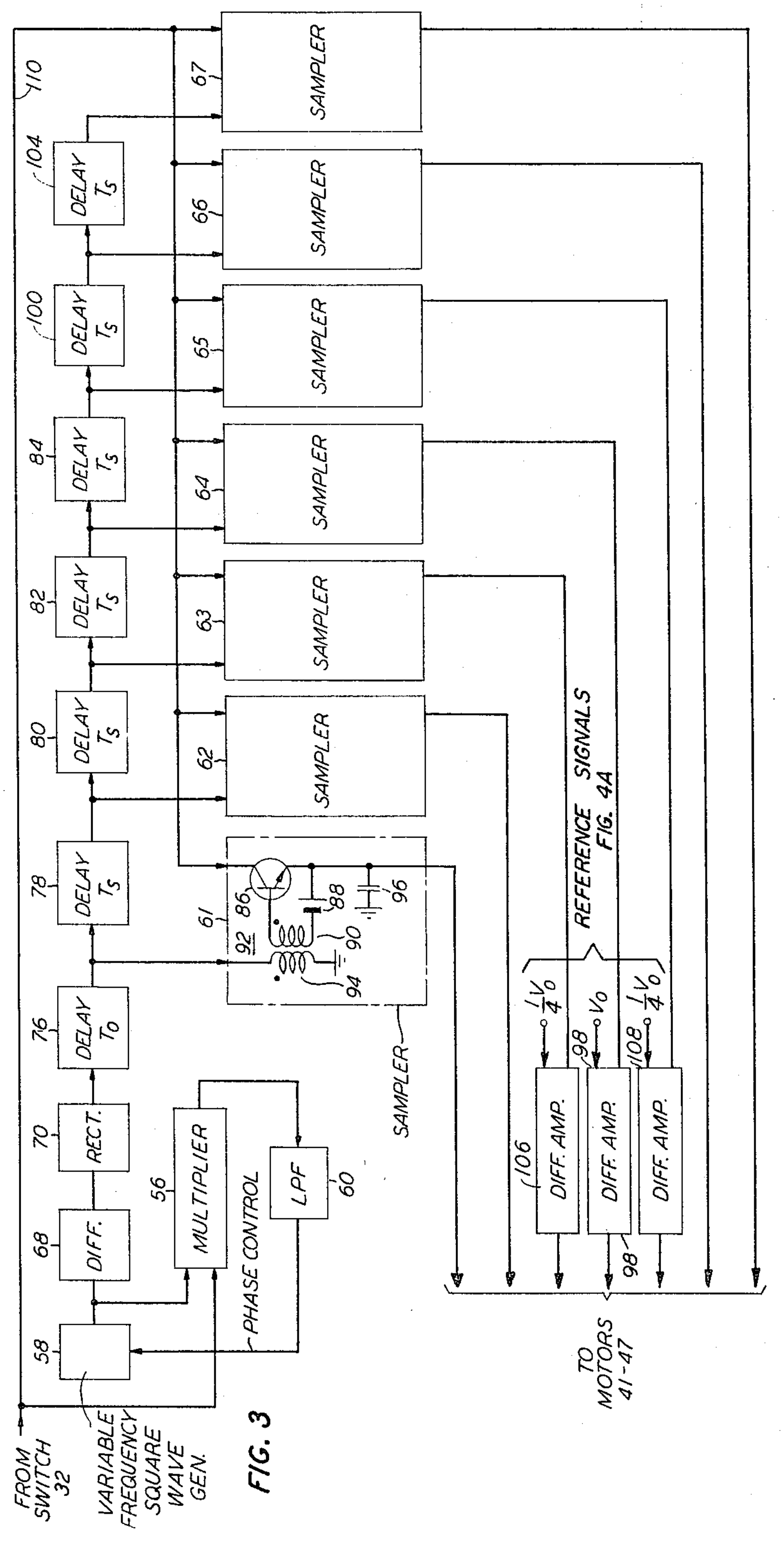
FIG. 3 is a schematic diagram partially in block form disclosing in detail the circuit arrangement of the control signal-producing circuitry shown in block form in FIG. 1.

FIG. 3 shows the details of control signal-producing circuitry 48. The test pulse signal passing through switch 32 from node 31 (FIG. 1) is applied to one input of a signal multiplier 56 and the output of a variable frequency, square wave generator 58 is applied to the other input of multiplier 56. Generator 58 could be a voltage tunable oscillator whose output is passed through a peak limiter or clipper. Multiplier 56 can in practice take a different form from multipliers 21 through 27 such as, for example, the circuit disclosed in figure 6–33 on page 186 of the textbook Electronic Engineering, by Samuel Seely, McGraw-Hill Book Company, Inc., 1956, which develops the product of two electric signals by means of vacuum tube circuits. The output of multiplier 56 is applied to a low-pass filter 60 that passes only the direct-current component thereof. This direct-current component is applied to vary the frequency and phase of the output of generator 58. The frequency and phase of generator 58 are thus adjusted to cause the output from low-pass filter 60 to go to zero. When this occurs, generator 58 is synchronized to the pulse signal at point 31, so that either the negative-to-positive or positive-to-negative transitions of the generator output, depending upon the relationship between the polarity of the control signal and the direction of the resulting frequency change of the generator, approximately coincide with the peaks of the pulse signal at node 31. It is assumed for the purpose of explanation that a positive control signal increases the frequency of generator 58. In such case, the negative-to-positive transitions in the output of generator 58 are synchronized to peaks of the pulse signal at point 31. A differentiator 68 produces short duration, positive spike-shaped pulses whenever the output from generator 58 changes from the negative to positive state and negative spike-shaped pulses whenever the output from multivibrator 58 changes from its positive to negative state. A rectifier 70 passes only the positive spike-shaped pulses (hereafter called spike pulses), marking peaks of the test pulse signal at node 31.

The test pulse signal passing through switch 32 from node 31 is also applied directly to each of samplers 61, 62, 63, 64, 65, 66, and 67 by way of a lead 110. The spike pulses are applied to a delay device 76, introducing a delay $T_0$ sufficient to retard each spike pulse until the start of the next test pulse at point 31. Each spike pulse at the output of delay device 76 is applied directly to sampler 61, through the tandem arrangement of delay device 78 to sampler 62, delay devices 78 and 80 to sampler 63, delay devices 78, 80 and 82 to sampler 64, delay devices 78, 80, 82, and 84 to sampler 65, delay devices 78, 80, 82, 84, and 100 to sampler 66, and delay devices 78, 80, 82, 84, 100, and 104 to sampler 67. Consequently, a spike pulse is applied to samplers 61 through 67 at successive points in time during each cycle of the test pulse signal appearing at node 31. The progression of a spike pulse during one cycle of the test pulse signal appearing at node 31 is illustrated by dashed lines T, U, V, W, X, Y, and Z, representing the points in time on the time axis of FIG. 4B at which the spike pulse arrives at samplers 61, 62, 63, 64, 65, 66, and 67, respectively. Preferably, the time interval between the arrival of a spike pulse at successive samplers is equal to $T_S$, the distance in terms of transmission delay between successive taps on delay line 18 (FIG. 1). Thus, delay devices 78, 80, 82, 84, 100, and 104 are each designed to introduce a delay $T_S$. Application of a spike pulse to each of samplers 61 through 67 actuates it instantaneously, thus registering a voltage representative of the test pulse signal at node 31 at the time of application of the spike pulse thereto. As the test pulse wave form at node 31 changes from cycle to cycle responsive to multiplier adjustment, the samples registered by samplers 61 through 67 also change in value to give a current indication of the actual test pulse wave form at node 31.

Circuitry exemplary of that employed in each of samplers 61 through 67 is shown within block 61. The signal to be sampled is applied to the collector of a transistor 86. The emitter-to-base circuit of transistor 86 comprises the series combination of a voltage source 88 and a secondary winding 90 of a transformer 92. Voltage source 88 normally maintains transistor 86 in cutoff. The spike pulses applied to sampler 61 to actuate the sampling operation are applied to a primary winding 94 of transformer 92. These spike pulses are transferred to secondary winding 90 where each causes the emitter-to-base circuit of transistor 86 to become forward biased momentarily. Thus, transistor 86 becomes conductive and passes the signal on its collector lead to a capacitor 96. Capacitor 96 stores a voltage representative of the magnitude of the pulse signal at node 31 at the sampling instant.

To determine the voltage values the reference source signals are to have, the values of the specified pulse wave form (FIG. 4A) are noted at points of time, with respect to the peak of the specified pulse wave form, corresponding to the sampling points of the pulse wave form at node 31, with respect to the peak of the pulse wave form at node 31. This can be accomplished graphically by projecting lines T, U, V, W, X, Y, and Z of FIG. 4B until they intersect the specified wave form of FIG. 4A. The values of the specified wave form, relative to any convenient base, at the points of intersection in FIG. 4A fix the voltage values of the signals of the reference source. With the peak value of the specified pulse wave form, $V_0$, taken as the base, the voltage values of the reference source corresponding to sampling points T, U, V, W, X, Y, and Z of the particular exemplary wave forms of FIGS. 4A and 4B are 0, 0, $\frac{1}{4}V_0$, $V_0$, $\frac{1}{4}V_0$, 0, and 0, respectively.

Each actual voltage sample is to be compared in magnitude with the corresponding standard voltage value, and a signal developed that is representative of the difference. The outputs from samplers 63, 64, and 65 together with their respective standard voltages $\frac{1}{4}V_0$, $V_0$, and $\frac{1}{4}V_0$ are applied to difference amplifiers 106, 98, and 108, respectively, to develop signals representative of the differences therebetween. Since the standard values at points, T, U, Y, and Z are zero, the outputs from the respective samplers 61, 62, 66, and 67 directly indicate these differences. Accordingly, as to these samplers, difference amplifiers are not necessary. The outputs of difference amplifiers 106, 98, and 108 and samplers 61, 62, 66, and 67 are the control signals that operate motors 41 through 47 (FIG. 1).

What is claimed is:

1. Apparatus for adjusting the transmission characteristics of a transversal filter having a plurality of adjustable multipliers determining the transmission characteristics of said filter, an input terminal, and an output terminal comprising a source of periodic signals connected to said input terminal, means for deriving samples at different points of the wave form actually appearing at said output terminal, said samples being equal in number to the number of multipliers on said filter, a source of reference signals the values of which define a specified wave form, said reference signals being equal in number to the number of multipliers, and means responsive to the difference in value between each sample and a corresponding reference signal for adjusting one of said multipliers to change the filter transmission characteristic toward a condition that results in coincidence of said actual wave form with said specified wave form.

2. In combination, apparatus comprising a transversal filter having an input terminal and an output terminal, said filter having a plurality of adjustable multipliers determining the transmission characteristics thereof, a source of periodic test pulses coupled to said input terminal, means for deriving samples defining the wave form of the test pulse signal appearing at said output terminal, said samples being equal in number to the number of multipliers, a source of reference signals the values of which correspond to desired sample values, means for deriving a control signal representative of the difference in value between each of the nonzero reference signals and its corresponding sample, means responsive to each control signal for adjusting one of said multipliers, and means responsive to each sample for which the corresponding reference signal is zero for adjusting one of said multipliers.

3. In combination, apparatus comprising a transversal filter having an input terminal and an output terminal, said filter comprising a delay line having taps along its length connected to a common summing point, an adjustable multiplier connected in the signal path of each of said taps between said delay line and said common point, said common point connected to one of said terminals, one end of said delay line connected to the other of said terminals, a source of periodic test pulses connected to said input terminal, means for deriving samples at different points of the wave form of the test pulse signal appearing at said output terminal, said samples being equal in number to the multipliers, a source of reference signals the values of which define a specified wave form, and means responsive to the difference in value between each of said samples and a corresponding reference signal for adjusting one of said multipliers until said sample coincides with said reference signal.

4. Apparatus for adjusting the transmission characteristics of a transversal filter having a delay line terminated at one end in its characteristic impedance, plural means situated along the length of said delay line for tapping signals appearing on said delay line, adjustable means for multiplying the signal tapped by each of said tapping means, means for combining the multiplied signals, first and second terminals, one of said terminals being coupled to the unterminated end of said delay line, and the other of said terminals being coupled to said combining means comprising a source of periodic pulse signals coupled to said first terminal, means for deriving signal samples defining the wave form actually appearing at said second terminal, said samples being equal in number to the number of said multiplying means, sources of standard signals the values of which define a specified wave form, said sources being equal in number to the number of said multiplying means, means for producing a control signal indicative of the difference in value between each of said samples relative to the remaining samples and a corresponding one of said standard signals relative to the remaining standard signals, and means for adjusting a different one of said multiplying means with each of said control signals.

5. Apparatus for equalizing the effects of a transmission medium comprising a source of periodic test pulses connected to the input of said medium, a transversal filter connected to the output of said medium, said filter having a plurality of adjustable multipliers for determining the transmission characteristics thereof, means for abstracting during each cycle of the test pulse signal time-spaced samples of the test pulse signal appearing at the output of said filter, one sample being abstracted for each of said multipliers, a source of reference signals corresponding to each of said samples abstracted during a cycle, means for comparing each of said samples with its corresponding reference signal and deriving a control signal indicative of the discrepancy therebetween, and means responsive to each of said control signals for adjusting a different one of said multipliers to bring said samples into correspondence with said reference signals.

6. Apparatus for equalizing the effects of a transmission medium comprising a source of periodic test pulses connected to the input of said medium, a transversal filter connected to the output of said medium, said filter having a plurality of adjustable multipliers for determining the transmission characteristics thereof, means for abstracting during each cycle of the test pulse signal time-spaced samples of the test pulse signal appearing at the output of said filter comprising means for producing periodic pulses synchronized to said test pulse signal at the output of said filter, pulse-actuated signal samplers, means for applying the signal appearing at the output of said filter to each of said samplers, and means for sequentially applying said pulses to said samplers during each cycle of said test pulse signal to actuate said samplers in succession, a source of reference signals corresponding to at least some of said samplers, means for comparing the magnitude of the signal stored by each of said samplers with the corresponding reference signal to derive a control signal representative of the discrepancy, means for applying each of said control signals to adjust a different one of said multiplying means, and means for applying the signal stored by each of said samplers for which there is no corresponding reference signal to adjust a different one of said multiplying means.

References Cited by the Examiner

UNITED STATES PATENTS 2,908,873 10/1959 Bogert ---------------- 333—18
2,908,874 19/1959 Pierce ---------------- 333—18

ELI LIEBERMAN, *Primary Examiner.*

P. L. GENSLER, *Assistant Examiner.*